US012792407B2

(12) United States Patent
Paterson et al.

(10) Patent No.: US 12,792,407 B2
(45) Date of Patent: Nov. 10, 2026

(54) APPARATUS AND METHOD FOR CONTROLLING ACCESS TO A SHARED RESOURCE

(71) Applicant: Arm Limited, Cambridge (GB)

(72) Inventors: Richard Andrew Paterson, Thurgoland (GB); Jonathan Baker, Sheffield (GB)

(73) Assignee: Arm Limited, Cambridge (GB)

( * ) Notice: Subject to any disclaimer, the term of this patent is extended or adjusted under 35 U.S.C. 154(b) by 800 days.

(21) Appl. No.: 18/098,334

(22) Filed: Jan. 18, 2023

(65) Prior Publication Data

US 2024/0241755 A1 Jul. 18, 2024

(51) Int. Cl.
*G06F 9/50* (2006.01)
*G06F 9/46* (2006.01)
*G06F 9/54* (2006.01)

(52) U.S. Cl.
CPC ............ *G06F 9/5033* (2013.01); *G06F 9/466* (2013.01); *G06F 9/468* (2013.01); *G06F 9/544* (2013.01)

(58) Field of Classification Search
CPC ........ G06F 9/5033; G06F 9/466; G06F 9/544; G06F 9/468
USPC ................................ 718/102, 104, 107, 108
See application file for complete search history.

(56) References Cited

U.S. PATENT DOCUMENTS 6,073,132 A * 6/2000 Gehman .............. G06F 13/362 710/200
7,174,552 B2 * 2/2007 Mikael ...................... G06F 9/52 718/103
2003/0167294 A1 * 9/2003 Neuman ............... G06F 9/4881 718/102
2004/0128563 A1 * 7/2004 Kaushik ................ G06F 9/4812 713/300
2009/0172675 A1 * 7/2009 Grossman ............... G06F 9/461 718/101
2010/0251010 A1 * 9/2010 Peters .................. G06F 3/0608 707/610

* cited by examiner

*Primary Examiner* — April Y Blair
*Assistant Examiner* — Justin Che-Chun Tong
(74) *Attorney, Agent, or Firm* — NIXON & VANDERHYE P.C.

(57) ABSTRACT

An apparatus and method for controlling access to a shared resource accessible to a plurality of initiator components is provided. The apparatus has shared resource management circuitry to select, from amongst the plurality of initiator components, a currently granted initiator component that is currently allowed to access the shared resource, and to identify the currently granted initiator component within a storage structure. Gating circuitry is located in a communication path between the given initiator component and the shared resource which, on receipt of a given transaction initiated by a given initiator component, determines with reference to the storage structure whether the given initiator component is the currently granted initiator component. The gating circuitry is arranged, when the currently granted initiator component is the given initiator component, to allow onward propagation of the given transaction to the shared resource, and is arranged, when the currently granted initiator component is other than the given initiator component, to block onward propagation of the given transaction to the shared resource and to trigger a recovery action to seek to facilitate future handling of the given transaction.

18 Claims, 6 Drawing Sheets

TRIGGER RECOVERY ACTION AT GATING CIRCUITRY (STEP 370 OF FIG. 5)

OPTION 1

OPTION 2

OPTION 3

(TRANSPARENT TO INITIATOR X)

APPARATUS AND METHOD FOR CONTROLLING ACCESS TO A SHARED RESOURCE

BACKGROUND

The current technique relates to an apparatus and method for controlling access to a shared resource.

In data processing systems it can often be the case that a shared resource is accessible to a plurality of components, and in such cases it is necessary to arbitrate between the accesses to that shared resource that may be requested by those components.

As the number of components that may share access to such a shared resource increase, the chance of there being multiple components seeking to access the shared resource at the same time tends to increase, and hence it becomes ever more desirable to provide an efficient technique for arbitrating between accesses to the shared resource.

SUMMARY

In one example arrangement, there is provided an apparatus comprising: a given initiator component to initiate transactions to access a shared resource, where the given initiator component is one of a plurality of initiator components that share access to the shared resource; shared resource management circuitry to select, from amongst the plurality of initiator components, a currently granted initiator component that is currently allowed to access the shared resource, and to identify the currently granted initiator component within a storage structure; and gating circuitry located in a communication path between the given initiator component and the shared resource to receive a given transaction initiated by the given initiator component to access the shared resource, and to determine with reference to the storage structure whether the given initiator component is the currently granted initiator component; wherein the gating circuitry is arranged, when the currently granted initiator component is the given initiator component, to allow onward propagation of the given transaction to the shared resource, and is arranged, when the currently granted initiator component is other than the given initiator component, to block onward propagation of the given transaction to the shared resource and to trigger a recovery action to seek to facilitate future handling of the given transaction.

In another example arrangement, there is provided a method of controlling access to a shared resource accessible to a plurality of initiator components, comprising: employing shared resource management circuitry to select, from amongst the plurality of initiator components, a currently granted initiator component that is currently allowed to access the shared resource, and to identify the currently granted initiator component within a storage structure; and receiving, at gating circuitry located in a communication path between a given initiator component of the plurality of initiator components and the shared resource, a given transaction initiated by the given initiator component to access the shared resource, and determining with reference to the storage structure whether the given initiator component is the currently granted initiator component; when the currently granted initiator component is the given initiator component, causing the gating circuitry to allow onward propagation of the given transaction to the shared resource; and when the currently granted initiator component is other than the given initiator component, causing the gating circuitry to block onward propagation of the given transaction to the shared resource and to trigger a recovery action to seek to facilitate future handling of the given transaction.

In a still further example arrangement, there is provided a computer-readable medium to store computer-readable code for fabrication of an apparatus comprising: a given initiator component to initiate transactions to access a shared resource, where the given initiator component is one of a plurality of initiator components that share access to the shared resource; shared resource management circuitry to select, from amongst the plurality of initiator components, a currently granted initiator component that is currently allowed to access the shared resource, and to identify the currently granted initiator component within a storage structure; and gating circuitry located in a communication path between the given initiator component and the shared resource to receive a given transaction initiated by the given initiator component to access the shared resource, and to determine with reference to the storage structure whether the given initiator component is the currently granted initiator component; wherein the gating circuitry is arranged, when the currently granted initiator component is the given initiator component, to allow onward propagation of the given transaction to the shared resource, and is arranged, when the currently granted initiator component is other than the given initiator component, to block onward propagation of the given transaction to the shared resource and to trigger a recovery action to seek to facilitate future handling of the given transaction. Such computer-readable code can be disposed in any known transitory computer-readable medium (such as wired or wireless transmission of code over a network) or non-transitory computer-readable medium such as semiconductor, magnetic disk, or optical disc.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
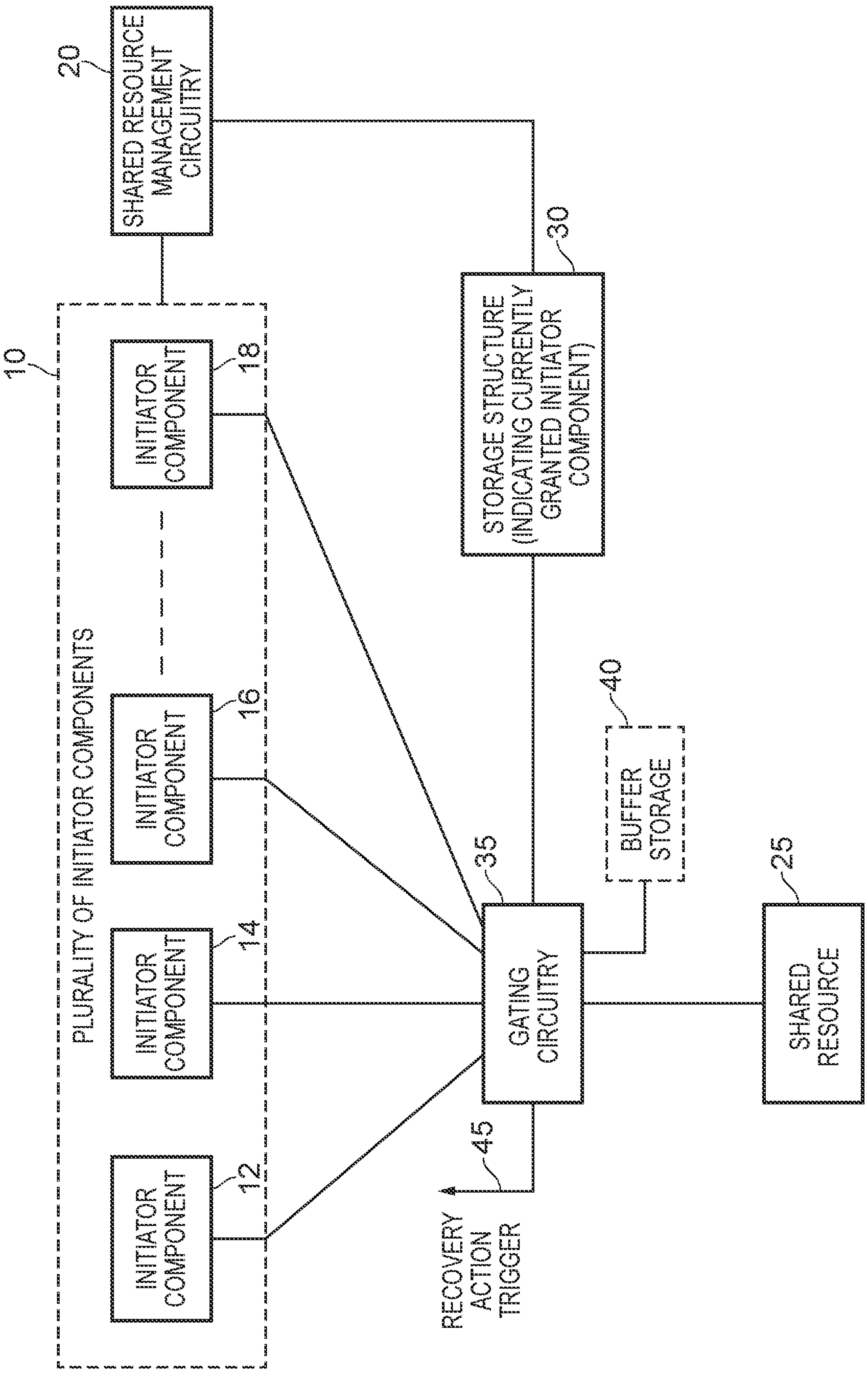
FIG. 1 is a block diagram of a system in accordance with one example implementation.

In accordance with the techniques described herein, an apparatus is provided that comprises a given initiator component that is configured to initiate transactions to access a shared resource. The shared resource is able to be accessed by a plurality of initiator components, with the given initiator component being one of those initiator components. The initiator components can take a variety of different forms dependent on implementation, but in some example implementations may be separate processing elements, and in one particular implementation may comprise separate central processing units (CPUs). Further, the shared resource could take a wide variety of different forms dependent on implementation, for example a universal asynchronous receiver-transmitter (UART), a memory controller controlling access to a shared memory device, etc.

Shared resource management circuitry is provided to manage which initiator component is currently allowed to access the shared resource. In particular, the shared resource management circuitry is arranged to select, from amongst the plurality of initiator components, the initiator component that is currently to be allowed access to the shared resource (such an initiator component being referred to herein as the currently granted initiator component), and to then identify the currently granted initiator component within a storage structure. Hence, at any point in time, the storage structure can be referred to in order to identify which initiator component is the currently granted initiator component. The shared resource management circuitry can be implemented in a variety of different ways. For instance, the shared resource management circuitry may be implemented as a separate hardware element to the various initiator components, for example taking the form of a separate CPU, or alternatively could be implemented by a suitable software process running on one of the initiator components.

Further, in accordance with the technique described herein, gating circuitry is located in a communication path between the given initiator component and the shared resource so as to receive a given transaction initiated by the given initiator component seeking to access the shared resource. The gating circuitry then determines, with reference to the storage structure, whether the given initiator component is the currently granted initiator component. In one example implementation, the gating circuitry is provided by one or more hardware components separate to the initiator components.

When the gating circuitry determines that the currently granted initiator component is the given initiator component, then the gating circuitry allows onward propagation of the given transaction to the shared resource. Conversely, if the currently granted initiator component is a different initiator component, then the gating circuitry is arranged to block onward propagation of the given transaction to the shared resource, and instead is arranged to trigger a recovery action to seek to facilitate future handling of the given transaction.

Hence, in accordance with the techniques described herein, the gating circuitry provides a hardware mechanism, separate to the initiator components, for determining whether any given transaction has been issued by the currently granted initiator component. When it is determined that a given transaction has been issued by an initiator component that is not the currently granted initiator component, the gating circuitry can then block onward propagation of that transaction and trigger a suitable recovery action. This avoids the need for the individual initiator components to monitor, on an ongoing basis, whether they are currently granted access before issuing transactions, or to use a handshaking mechanism to seek to gain exclusive access to the shared resource, hence improving efficiency. Instead, the gating circuitry can determine, at the time any given transaction is received by it en route to the shared resource, whether that transaction has been issued by an initiator component that is the currently granted initiator component, such that the blocking of a transaction only occurs when there is a real access violation detected by the gating circuitry.

This can significantly improve performance of the system, compared for example with an alternative approach where an initiator component is required to check the storage structure before issuing each transaction to make sure that it is still the currently granted initiator component, or instead is required to implement a suitable handshaking mechanism to seek to acquire exclusive access to the shared resource for the period of time that it is issuing a sequence of transactions. Further, such alternative approaches can give rise to race conditions, that are alleviated through use of the present technique.

In addition, through the provision of such gating circuitry, the reallocation of the shared resource amongst the various initiator components can be managed much more simply by the shared resource management circuitry. In particular, since the provision of the gating circuitry ensures that an access permission check in respect of any given transaction is made at the time that transaction is received by the gating circuitry, then the shared resource management circuitry can change the currently granted initiator component as and when desired, and as soon as the storage structure is updated to reflect that change any transaction subsequently received by the gating circuitry will be checked against the updated storage structure contents.

There are various ways in which the gating circuitry may trigger the recovery action. However, in accordance with example implementations described herein, the gating circuitry is arranged to trigger the recovery action by asserting a signal that triggers processing to be performed in order to cause the shared resource management circuitry to select the given initiator component as the currently granted initiator component, to thereby allow the given transaction to be propagated to the shared resource. The asserted signal from the gating circuitry could take various forms. For instance, as will be discussed in more detail below, the signal could be asserted to the given initiator component to cause the given initiator component to request the shared resource management circuitry to mark the given initiator component as the currently granted initiator component within the storage structure, or instead the signal could be asserted from the gating circuitry to the shared resource management circuitry to request the shared resource management circuitry to mark the given initiator component as the currently granted initiator component within the storage structure.

In one example arrangement, the given initiator component is arranged, prior to initiating a first transaction of a sequence of transactions, to determine with reference to the storage structure whether the given initiator component is the currently granted initiator component, and to issue a grant request signal to the shared resource management circuitry when the currently granted initiator component is indicated to be other than the given initiator component. Hence, when seeking to start a sequence of transactions, the given initiator component can be arranged to send a request to the shared resource management circuitry if it is not already indicated to be the currently granted initiator component.

Then, the shared resource management circuitry may be arranged, in response to the grant request signal, to select the given initiator component as the currently granted initiator component. In one example implementation, none of the initiator components are required to obtain any form of locked access to the shared resource, and hence the shared resource management circuitry can be arranged to freely change which initiator component is marked as the currently granted initiator component, given that the gating circuitry will detect and block any transactions received by it that originate from an initiator component that is no longer indicated as the granted initiator component in the storage structure.

In one example implementation, at the time the shared resource management circuitry selects the given initiator component as the currently granted initiator component in response to a grant request signal from that given initiator component, then in addition to updating the storage structure to identify the given initiator component as the currently granted initiator component, the storage structure will also be updated to indicate that any previously granted initiator component is no longer granted access. In particular, however the storage structure is constructed, the shared resource management circuitry can be arranged to ensure that at any point in time only one initiator component is marked as the currently granted initiator component.

In one example implementation, the given initiator component is arranged, following issuance of the grant request signal, to monitor the storage structure in order to detect when the given initiator component is indicated as the currently granted initiator component.

However, in one example implementation, once the given initiator component has detected that it is now indicated as the currently granted initiator component following the issuance of the grant request signal, it is no longer required to monitor the storage structure on an ongoing basis. Instead, the given initiator component may be arranged, responsive to detecting that the currently granted initiator component is the given initiator component, to initiate the first transaction, and to then initiate each subsequent transaction in the sequence of transactions without further reference to the storage structure, unless interrupted by the gating circuitry triggering the recovery action in response to detecting that the given initiator component is no longer the currently granted initiator component. This hence significantly improves efficiency within the system, particularly within a system where there are a relatively large number of initiator components that may be sharing access to the shared resource.

As mentioned earlier, there are various ways in which the gating circuitry can be arranged to trigger the recovery action, but in one example implementation the gating circuitry does this by asserting an interrupt signal to the given initiator component to cause the given initiator component to execute a given exception handling routine. Hence, via the interrupt signal, the given initiator component is notified when one of its issued transactions has been blocked by the gating circuitry, and the execution of the given exception handling routine is used to implement the recovery action.

In one example implementation, the given initiator component is arranged, on executing the given exception handling routine, to issue a grant request signal to the shared resource management circuitry, and to then monitor the storage structure in order to detect when the given initiator component is once again indicated to be the currently granted initiator component. By such an approach, the given initiator component can then detect when it has been re-granted access to the shared resource, by virtue of the storage structure being updated to indicate the given initiator component as the currently granted initiator component. At that point, the given initiator component can then be arranged to reinitiate the given transaction.

In one example implementation, when the gating circuitry determines that the given transaction should be blocked and issues an interrupt signal back to the given initiator component, it may at that point discard the given transaction since, as mentioned above, the given initiator component will reinitiate the given transaction in due course. However, in an alternative example implementation, the gating circuitry may be arranged, when triggering the recovery action, to store the given transaction within buffer circuitry accessible to the gating circuitry. Such an approach then enables the given transaction to be forwarded on to the shared resource by the gating circuitry once the given initiator component is once again indicated to be the currently granted initiator component, without the given initiator component being required to re-initiate the given transaction.

Hence, in one example implementation, once the given initiator component has issued the grant request signal to the shared resource management circuitry upon executing the given exception handling routine, the given initiator component may then monitor the storage structure to determine when it has been re-granted access to the shared resource, and then at that point may notify the gating circuitry so that the gating circuitry can release the given transaction as buffered locally to the gating circuitry, without the given initiator component needing to re-initiate the given transaction.

As a yet further alternative approach, for example within an initiator component that can support multiple contexts, then it may be possible to allow the initiator component to switch from the original context that was using the shared resource in order to perform other useful work of another context whilst waiting for the shared resource management circuitry to re-grant access to the shared resource. For instance, the gating circuitry could be arranged to monitor the storage structure to determine when the given initiator component has once again been marked as the currently granted initiator component, and to notify the given initiator component when that is detected. Hence, in such an approach, on receipt of the interrupt, the given initiator component could switch context in order to execute the given exception handling routine, and then rather than merely returning to the original context that was using the shared resource in order to wait until it is re-granted access to the shared resource, the given initiator component could instead perform processing in one or more other contexts until notified by the gating circuitry that the given initiator component has been once again indicated as the currently granted initiator component, at which point the given initiator component could return to the original context that was using the shared resource, and continue performing the required processing operations in that context.

In some instances, it may be the case that the transactions initiated by the given initiator component conform to a transaction protocol that requires a response to be provided to the given initiator component for each transaction initiated by the given initiator component. In such cases, the gating circuitry can be arranged to ensure that the transaction protocol is complied with, including in situations where it is determined that the given transaction should be blocked. In particular, in one example implementation, the gating circuitry may be arranged, when blocking onward propagation of the given transaction to the shared resource, to provide a dummy response to the given initiator component in order to provide compliance with the transaction protocol. The form of this dummy response can be varied dependent on implementation. For example, assuming the given transaction is a write transaction for which a write response is expected in order to comply with the transaction protocol, then a write response could be issued by the gating circuitry if desired. As noted earlier, when blocking the given transaction in accordance with the above described technique, an interrupt signal is also asserted to the given initiator component from the gating circuitry, and on processing that interrupt the given initiator component can be arranged to ignore or discard the dummy response, and as a result any suitable form of dummy response could be used merely to ensure that the transaction protocol is conformed to.

The interrupt signal asserted by the gating circuitry can take a variety of forms. In one particular example implementation, the given initiator component may be provided with interrupt handling circuitry that is configured to handle interrupts of multiple interrupt types. In such an implementation, the gating circuitry may for example be arranged to assert the interrupt signal so as to identify an interrupt type of higher priority than at least one other interrupt type amongst the multiple interrupt types. By using a higher priority interrupt, this can reduce the latency between the time the interrupt signal is asserted, and the time the interrupt is handled by the given initiator component by executing the given exception handling routine. It can hence potentially reduce the amount of processing that needs to be replayed following the given initiator component being re-granted access to the shared resource. As a particular example, in implementations that support standard interrupt requests and fast interrupt requests, the interrupt request from the gating circuitry may take the form of a fast interrupt request (FIQ).

As an alternative to the above described approach where the gating circuitry issues an interrupt signal to the given initiator component when the given transaction is blocked, the gating circuitry could instead be arranged to trigger the recovery action by communicating directly with the shared resource management circuitry (for example by asserting a request signal to it) in order to seek to cause the given initiator component to be re-marked as the currently granted initiator component. In some implementations, this could enable the fact that the given transaction has been blocked to effectively be handled transparently to the given initiator component, since the given transaction may then be able to be released to the shared resource once the given initiator component is re-marked as the currently granted initiator component. In systems where the given initiator component expects a response signal in respect of each transaction, then the response signal could at that point be issued back to the given initiator component.

Such an approach could for example be adopted in a system where the gating circuitry has access to a local buffer in which to temporarily store transactions that are blocked. For instance, the gating circuitry may be arranged, when triggering the recovery action, to store the given transaction within buffer circuitry accessible to the gating circuitry. Then, following sending of the request signal to the shared resource management circuitry, the gating circuitry may be arranged to monitor the storage structure in order to detect when the given initiator component is once again indicated to be the currently granted initiator component, and upon such detection to output the given transaction from the buffer circuitry for onward propagation to the shared resource.

The request signal sent by the gating circuitry to the shared resource management circuitry could take a variety of forms. For example, the request signal could take the form of an interrupt signal, for instance in implementations where the shared resource management circuitry is a dedicated processor, but could alternatively take other forms. For instance the shared resource management circuitry could be implemented as a finite state machine (FSM) that receives request signals and arbitrates between them in hardware.

In a modified version of the above implementation, in situations where the given initiator component is able to support multiple contexts, the gating circuitry could be arranged, on blocking the transaction, to notify the given initiator component that there is expected to be some delay in the handling of the given transaction, to thereby allow the given initiator component to switch context and perform some other useful processing in the interim. Once the gating circuitry detects that the given initiator component has been re-marked as the currently granted initiator component, it can then release the given transaction, and notify the given initiator component so that the given initiator component can switch back to the original context.

In one example implementation, a separate instance of the gating circuitry is provided for each initiator component in the plurality of initiator components, such that a given instance of the gating circuitry has an associated initiator component amongst the plurality of initiator components and is arranged to control whether to block or allow onward propagation of a transaction issued by the associated initiator component in dependence on whether the associated initiator component is identified in the storage structure as the currently granted initiator component. Such an approach can provide a design that is readily scalable, and hence could be applied to systems with larger and larger numbers of initiator components that share access to a shared resource.

However, it is not a requirement to provide a separate instance of the gating circuitry for each initiator component. In accordance with an alternative example implementation, the gating circuitry may be arranged to receive transactions issued by the plurality of initiator components and, for a given received transaction, to determine the initiator component that initiated the given received transaction and to block or allow onward propagation of the given received transaction in dependence on whether the initiator component that initiated the given received transaction is identified in the storage structure as the currently granted initiator component. Hence, in accordance with such an implementation the functionality of the gating circuitry may be centralised, with for example a single instance of the gating circuitry monitoring the transactions issued by any of the plurality of initiator components. A variety of different techniques could be used to identify the source of any particular transaction. For example, many transaction protocols may incorporate a transaction identifier within header information of the transaction, and that transaction identifier information could be analysed by the gating circuitry to determine which initiator component issued a received transaction, and hence enable the gating circuitry to determine whether that initiator component is the currently granted initiator component identified within the storage structure.

In one example implementation, the shared resource management circuitry is arranged to control the storage structure to ensure that, at any point in time, only one initiator component is indicated as the currently granted initiator component. As mentioned earlier, the technique described herein provides the shared resource management circuitry with a great degree of flexibility as to when the currently granted initiator component can be changed. In particular, since the gating circuitry will monitor each transaction it receives, block any transaction that it receives that is not associated with the currently granted initiator component as indicated in the storage structure, and trigger an appropriate recovery action for any blocked transaction, then in one example implementation there is no particular restriction on the point in time at which the shared resource management circuitry can change the initiator component that is to be granted access to the shared resource.

In particular, there is no need to wait for a currently granted initiator component to reach a certain stage in its processing before the removal of the grant for that initiator component, and the granting of access to another initiator component. Hence, in response to a request for access by an initiator component that is not the currently granted initiator component, the shared resource management circuitry can merely remove the grant from any currently granted initiator component, grant access to the initiator component that is requesting access, and update the storage structure accordingly. By ensuring that during that process only one initiator component is ever indicated as being granted access to the shared resource at any point in time, this provides a simple update mechanism for the shared resource management circuitry, and simplifies the checking procedures implemented by the gating circuitry.

The storage structure can take a variety of forms. In one example implementation, the storage structure is a single storage element identifying the currently granted initiator component. Hence, in accordance with such an approach, a global storage structure may be provided, whose stored value identifies which initiator component is the currently granted initiator component. The value stored within such a storage structure can take a variety of forms. Merely by way of example, the storage structure could take the form of a one hot register, holding an N-bit value, where N is the number of initiator components that may issue transactions to the shared resource and hence each bit in the N-bit value can be associated with one of the initiator components. At any point in time only a single bit in the N-bit value will be set (the set state could in one example implementation be a logic 1 value, whilst in another implementation the set state could be a logic 0 value) to identify the corresponding initiator component as the currently granted initiator component.

However, in an alternative implementation, the storage structure could instead be implemented by a plurality of storage elements, where each storage element is associated with one of the initiator components in the plurality of initiator components and is arranged to identify whether the associated initiator component is the currently granted initiator component. Such an approach may be particularly beneficial when employed in combination with the earlier discussed example implementation where a separate instance of the gating circuitry is provided for each initiator component, providing a sub-system design that is readily scalable as the number of initiator components is increased. In particular, a separate sub-system can be provided for each initiator component, that sub-system including the initiator component, the associated instance of the gating circuitry, and the associated storage element for that initiator component. The shared resource management circuitry can then be arranged to ensure that, at any point in time, only one of the storage elements is in the set state to identify the associated initiator component as being the currently granted initiator component.

The types of transactions monitored by the gating circuitry may vary dependent on implementation. In one example implementation, the gating circuitry is arranged to receive and monitor at least write transactions issued by the given initiator component. In some implementations, the gating circuitry could also be arranged to receive and monitor read transactions, or in a yet further alternative implementation the gating circuitry may be arranged to monitor read transactions but not write transactions.

Particular example implementations will now be discussed with reference to the accompanying figures.

FIG. 1 is a block diagram of a system in accordance with one example implementation. A plurality 10 of initiator components 12, 14, 16, 18 is provided, each of which is able to initiate transactions to access a shared resource 25. The initiator components could take a variety of forms, but for the purposes of the present discussion it will be assumed that each initiator component is a separate processing device, for example a separate CPU. The transactions may take a variety of forms dependent on implementation, and hence for example could be write transactions, read transactions, or both read and write transactions. Similarly, the shared resource can take a variety of forms. However, for the purposes of an example implementation, the shared resource 25 may be considered to be a UART.

Shared resource management circuitry 20 is provided to arbitrate access to the shared resource 25 by the plurality 10 of initiator components, and in particular to determine, at any point in time, which initiator component 12, 14, 16, 18 is to be considered as the currently granted initiator component. A storage structure 30 is provided in which the shared resource management circuitry 20 is arranged to indicate the currently granted initiator component. The shared resource management circuitry can be implemented in a variety of different ways. For instance, the shared resource management circuitry may be implemented as a separate hardware element to the various initiator components, for example taking the form of a separate CPU, or alternatively could be implemented by a suitable software process running on one of the initiator components.

Gating circuitry 35 is provided in a communication path between the initiator components 12, 14, 16, 18 and the shared resource 25, so as to intercept any transaction initiated by one of those components that is destined for the shared resource, and to reference the storage structure 30 in order to determine whether the initiator component responsible for that transaction is indicated as the currently granted initiator component. If it is, then the gating circuitry merely allows the transaction to be propagated on to the shared resource. However, if the gating circuitry determines that the transaction has been issued by an initiator component that is not indicated in the storage structure as the currently granted initiator component, the gating circuitry is arranged to block onward propagation of that transaction to the shared resource 25, and instead is arranged to trigger a recovery action by asserting a signal over path 45.

As will be discussed in more detail later, a variety of different techniques can be used to trigger the recovery action, and hence whilst in some implementations the signal over path 45 may be sent to the initiator component whose transaction has been blocked, in an alternative implementation the signal over path 45 may be sent directly to the shared resource management circuitry 20. Irrespective of the technique used to trigger the recovery action, the aim of performing the recovery action is to seek to facilitate future handling of the transaction that has been blocked. Hence, in accordance with the techniques described herein, the recovery action involves performance of steps with the aim of bringing about an update to the storage structure contents, so as to indicate the initiator component whose transaction has been blocked as being the currently granted initiator component, so that that blocked transaction can be re-tried.

Whilst in one example implementation, when the gating circuitry 35 blocks a given transaction, it may effectively discard that transaction, with the transaction in due course being re-initiated from the relevant initiator component once the recovery action has been performed, in an alternative example implementation the gating circuitry 35 may be provided with a local buffer storage 40 into which it can buffer one or more transactions. In that case, the buffer storage 40 may be used to locally buffer a given transaction that has been blocked, so that when in due course the recovery action has been performed, and it is detected that the storage structure indicates the relevant initiator component as now being the currently granted initiator component, the gating circuitry can directly propagate the given transaction onto the shared resource 25 without that transaction needing to be reinitiated by the relevant initiator component.

Both the gating circuitry 35 and the storage structure 30 may be implemented in a variety of ways. For example, the gating circuitry 35 could be provided as a centralised hardware structure that is arranged to receive transactions destined for the shared resource 25 that are issued by any of the initiator components 12, 14, 16, 18, with the gating circuitry 35 determining, for any given transaction that it receives, the initiator component that has issued that transaction. This could for example be determined from analysis of certain header information provided within the transaction. Similarly, the storage structure 30 could be a centralised structure whose value identifies the currently granted initiator component. The way in which the value stored in the storage structure identifies the currently granted initiator component can be varied dependent on implementation. For example, assuming there are N initiator components 12, 14, 16, 18 that can initiate transactions in respect of the shared resource 25, then in one example implementation an N-bit one-hot value could be stored within the storage structure 30, such that the single set bit within that one hot value identifies the currently granted initiator component. Alternatively, an at least Y-bit value stored within the storage structure 30 could be used to identify any one of the N initiator components, where $N=2^Y$.

In an alternative implementation, rather than providing centralised gating circuitry, an instance of the gating circuitry is provided for each initiator component, and used to monitor the transactions issued by that associated initiator component to the shared resource 25. Similarly, a separate storage element may be provided in association with each initiator component, and used to indicate when that associated initiator component is the currently granted initiator component. Such an approach is illustrated schematically in FIG. 2. In this example, the system may incorporate multiple sub-systems 100, 100', 100", 100'", etc. The sub-systems may take a variety of forms, and need not be identical to each other, but in one example implementation each sub-system comprises an initiator component 110 (also referred to in FIG. 2 as a shared resource user), associated gating circuitry 120 (referred to in FIG. 2 as a shared resource completer gate), and an associated storage element 115 (referred to in FIG. 2 as a resource grant register 115).

Each of the sub-systems 100, 100', 100", 100"" is coupled via a bus 135 with the shared resource 140. Further, shared resource management circuitry 130 (referred to in FIG. 2 as the shared resource arbitration owner) is provided for receiving grant request signals (referred to in FIG. 2 as resource request signals) from any of the initiator components 110, for determining at any point in time the initiator component to be considered the currently granted initiator component, and for issuing control signals to the various resource grant registers 115 so that at any point in time only one of those resource grant registers indicates that its associated initiator component is the currently granted initiator component.

Figure 2:
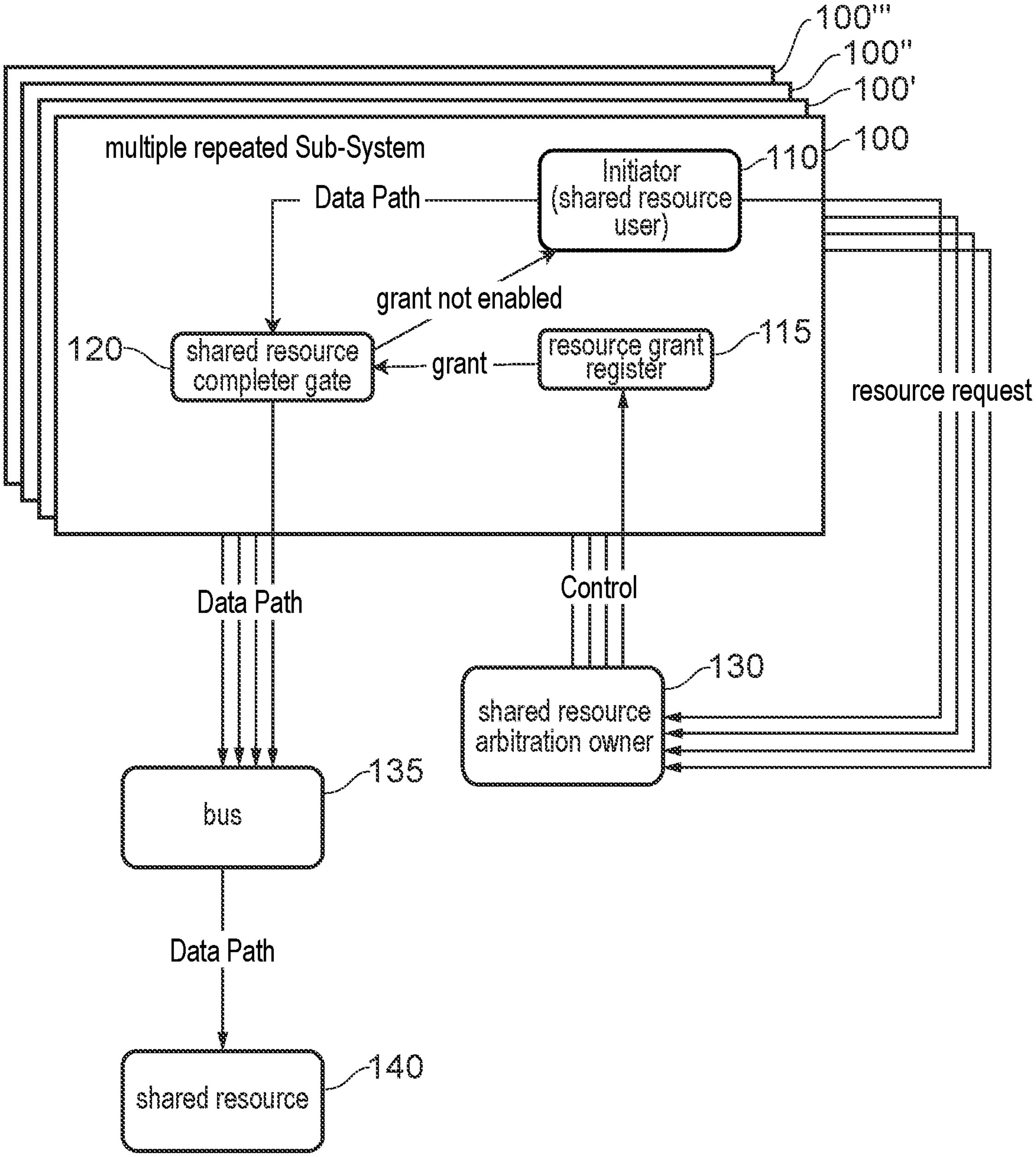
FIG. 2 is a block diagram of a system in accordance with a particular example implementation.

In the example of FIG. 2, it is assumed that the recovery action trigger signal sent by the gating circuitry 120, on determining that the associated initiator component 110 has initiated a transaction but is not indicated in the associated resource grant register 115 as the currently granted initiator component, takes the form of a "grant not enabled" signal sent to the initiator component 110. In one example implementation the grant not enabled signal takes the form of an interrupt signal sent to the initiator component 110, causing the initiator component to execute a given exception handling routine in order to implement the recovery action. When executing the exception handling routine, this causes the initiator component 110 to issue a grant request signal to the shared resource management circuitry 130. As will be discussed in more detail later, this causes the shared resource management circuitry to deselect the initiator component that was indicated as the currently granted initiator component prior to receipt of that grant request signal, and to then select the initiator component that has issued the grant request signal as the currently granted initiator component. The relevant resource grant registers 115 within the various sub-systems will then be updated accordingly, and as discussed earlier in one example implementation those updates are performed such that at any point in time only one of the initiator components is indicated as the currently granted initiator component.

Figure 3:
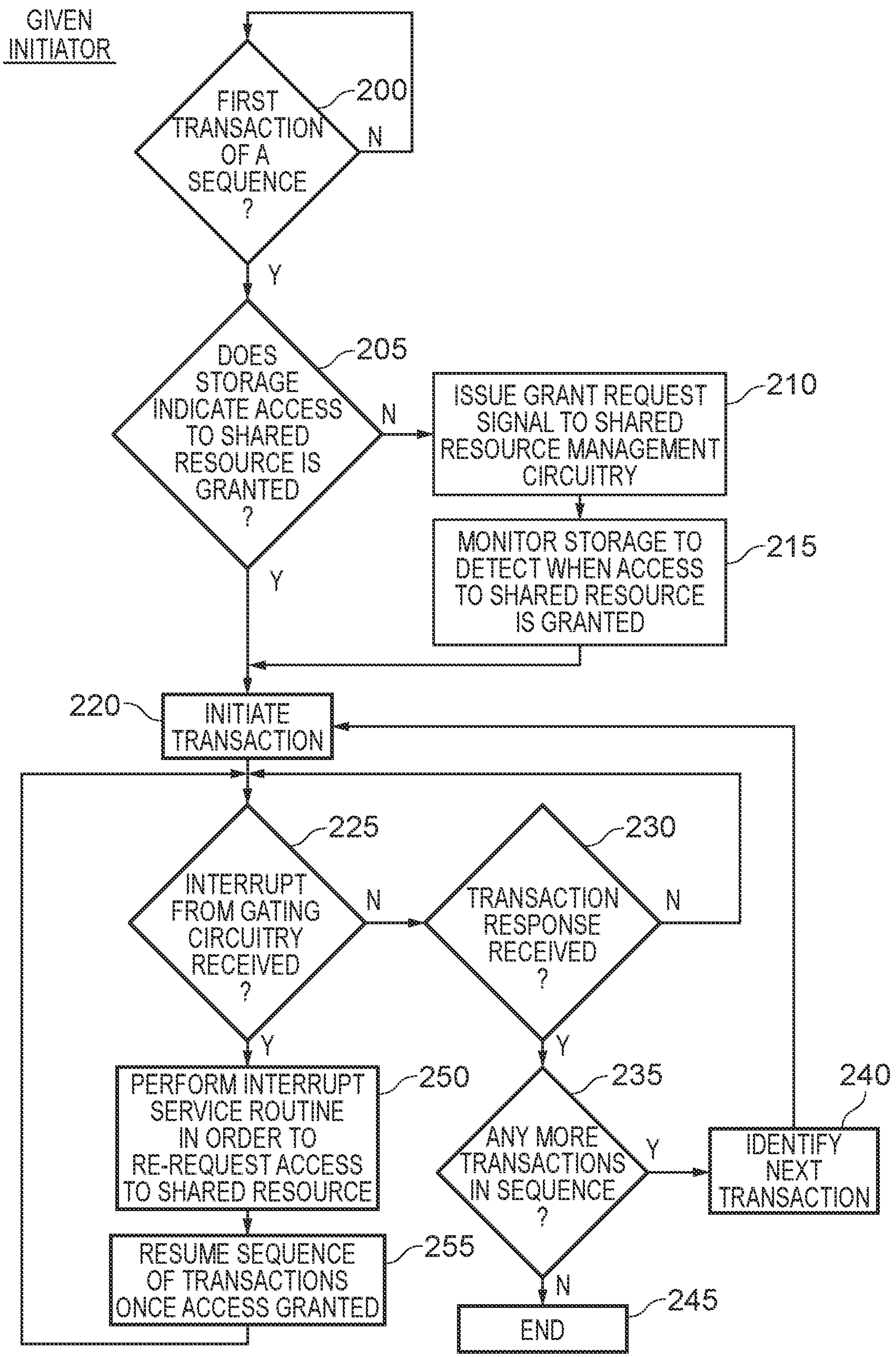
FIG. 3 is a flow diagram illustrating steps performed by an initiator component in accordance with one example implementation.

FIG. 3 is a flow diagram illustrating steps performed by a given initiator component 110. At step 200, it is determined whether that initiator component wishes to send the first transaction of a sequence of transactions to the shared resource, and when that condition is detected, it is then determined at step 205 whether the associated storage element 115 indicates that access to the shared resource has been granted to that initiator component. If it has, then the process can proceed to step 220 where the transaction is initiated, but if it has not the process proceeds to step 210 where the initiator component issues a grant request signal to the shared resource management circuitry 130. In a system where there are a relatively large number of initiator components all seeking to use the shared resource, it will be appreciated that it is likely, at the time a given initiator component has a first transaction in a sequence to send, that it will not be indicated at that time as the currently granted initiator component, and hence the process is likely to proceed at this point via step 210.

Once the initiator component has issued the grant request signal at step 210, it then at step 215 monitors the associated storage element 115 to detect when it has been granted access to the shared resource. Once it detects that it has been granted access, then the process proceeds to step 220 where the first transaction is initiated.

Thereafter, the process proceeds to step 225 where it is determined whether an interrupt has been received from the gating circuitry. Such an interrupt signal would indicate that, at the point in time the transaction is reviewed by the gating circuitry 120, the gating circuitry has determined that the resource grant register 115 no longer indicates the associated initiator component 110 as the currently granted initiator component, and that hence a recovery action is needed. In some example implementations, the gating circuitry may be arranged, in combination with issuing such an interrupt signal, to also send any transaction response signal expected by the initiator component in order to be compliant with the transaction protocol employed within the system. Such a transaction response signal will be referred to herein as a dummy response signal, and can take any suitable form. For example, for a write transaction, the dummy response signal may take the form of a write response signal, but the issuance of the interrupt signal in combination with the dummy response signal will cause the initiator component in due course to discard the write response signal.

If an interrupt from the gating circuitry is detected at step 225, then the initiator component will interrupt its current processing operations, and instead perform at step 250 the required interrupt service routine indicated by the interrupt signal. Performance of the interrupt service routine will cause the initiator component to re-request access to the shared resource, by issuing a grant request signal to the shared resource management circuitry 130. Thereafter, in one example implementation the initiator component monitors the associated resource grant register 115 in order to determine when it has been re-granted access to the shared resource, and thereafter, as indicated at step 255, the sequence of transactions are resumed once access has been re-granted.

In one example implementation, such resumption may involve the initiator component resending the transaction that had been blocked, but as discussed earlier, in an alternative example implementation the gating circuitry may be able to locally buffer that transaction, so that there is no need for the transaction to be resent from the initiator component once access has been re-granted. Instead, the initiator component may merely notify the gating circuitry that access has been re-granted, allowing the gating circuitry to release the buffered transaction, or alternatively the gating circuitry may be arranged to monitor the associated resource grant register 115 itself, and release the transaction when the initiator component has been re-granted access. In one example implementation where the gating circuitry monitors the associated resource grant register 115 at this stage, then once the initiator component has issued the grant request signal the initiator component may be allowed to perform processing in one or more other contexts until notified by the gating circuitry that it has once again been indicated as the currently granted initiator component, at which point that initiator component could return to the original context that was using the shared resource, and continue performing the required processing operations in that context. Following resumption of the sequence of transactions at step 255, the process returns to step 225.

If at step 225 it is determined that no interrupt has been received from the gating circuitry, it is then determined at step 230 whether a transaction response has been received in the absence of an interrupt, this indicating that the transaction has been successfully propagated to the shared resource, and that hence the initiator component can progress to handling a subsequent transaction. As shown in FIG. 3, the process loops through steps 225 and 230 until either an interrupt is received from the gating circuitry to identify that the transaction has been blocked, or a successful transaction response is received at step 230, indicating that the processing can proceed to the next transaction.

Following detection of a successful transaction response at step 230, it is determined at step 235 whether any more transactions are to be sent in the sequence, and if so the next transaction is identified at step 240, whereafter that transaction is initiated at step 220. Once all of the transactions have been processed, then the sequence of steps shown in FIG. 3 ends at step 245.

Figure 4:
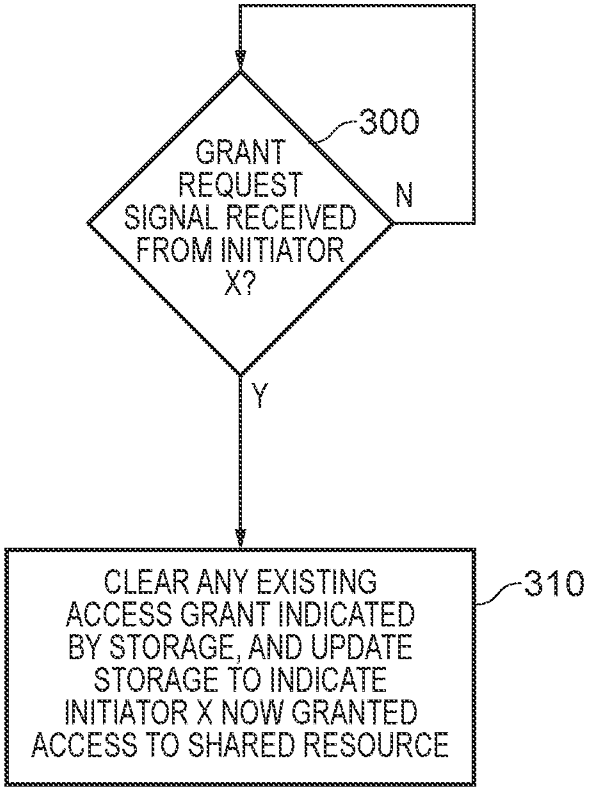
FIG. 4 is a flow diagram illustrating steps performed by the shared resource management circuitry in accordance with one example implementation.

FIG. 4 is a flow diagram illustrating steps performed by the shared resource management circuitry in accordance with one example implementation. At step 300, it is determined whether a grant request signal has been received from an initiator component. When a grant request signal is received from an initiator component (which for ease of discussion will be referred to as initiator component X for the purposes of FIG. 4), then the process proceeds to step 310 where any existing access grant indicated by the storage structure is cleared. When adopting the approach of FIG. 2, this will involve clearing the relevant resource grant register 115 that is associated with the initiator component that was indicated as the currently granted initiator component at the time the grant request signal was detected at step 300. In addition, the resource grant register 115 associated with the initiator component X will be set to indicate that the initiator component X is now granted access to the shared resource. As will be apparent from the earlier discussion of FIG. 3, this change in state of the relevant resource grant register will then be detected by either the associated initiator component 110 or the associated gating circuitry 120.

Figure 5:
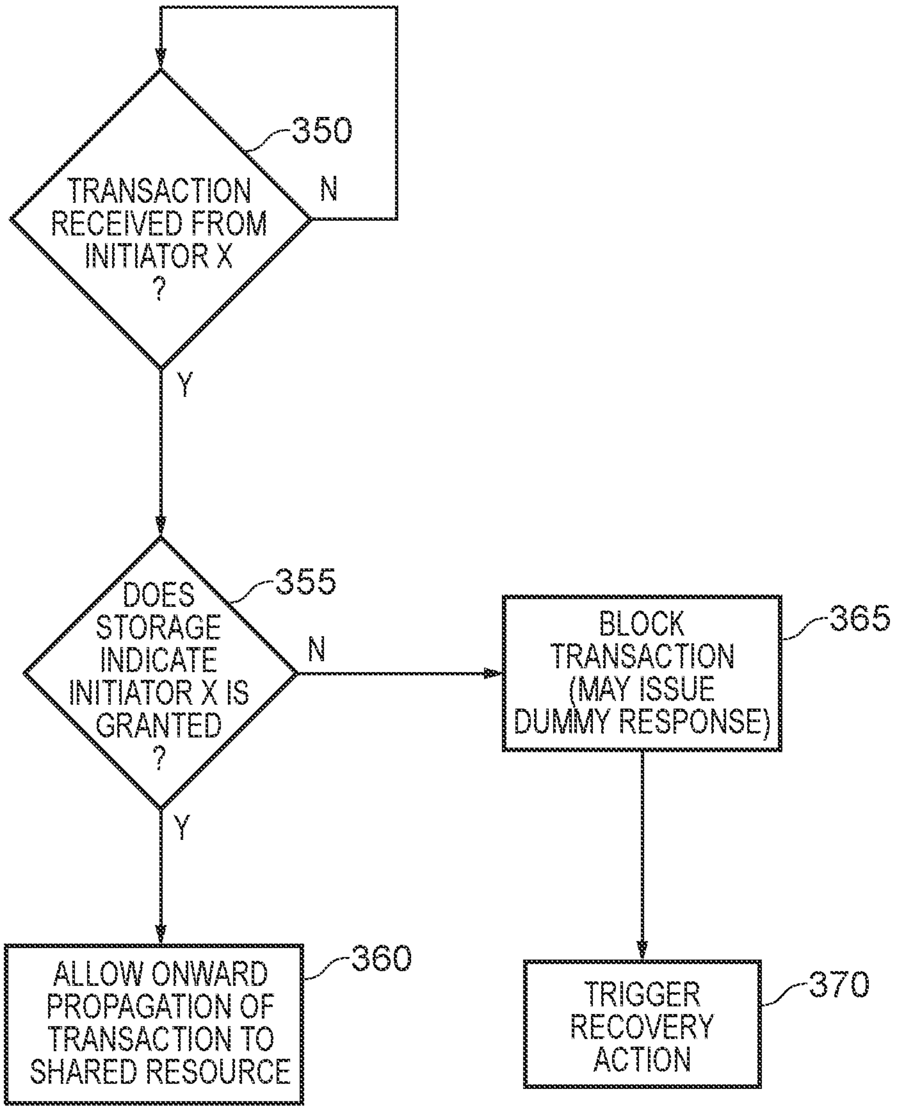
FIG. 5 is a flow diagram illustrating steps performed by the gating circuitry in accordance with one example implementation.

FIG. 5 is a flow diagram illustrating the operation of the gating circuitry in accordance with one example implementation. At step 350, it is determined whether a transaction has been received by the gating circuitry from an initiator component. In an implementation where a centralised gating circuitry is used, then the transaction may be received from any of the initiator components 12, 14, 16, 18, and in association with detecting receipt of a transaction at step 350 the gating circuitry will also determine which initiator component the transaction has been issued by, for example by analysing certain information provided within the header of the transaction. However, when employing the multiple sub-system approach of FIG. 2, then when any given gating circuitry 120 receives a transaction, it will know that that transaction is from the associated initiator component.

When a transaction is received from a given initiator component (which for ease of discussion will be referred to as initiator component X for the purposes of FIG. 4), the process proceeds to step 355. At step 355, it is determined whether the storage structure indicates that the initiator component X is the currently granted initiator component. Depending on implementation, this may involve the gating circuitry referencing a centralised storage structure indicating which one of the initiator components is the currently granted initiator component, or when adopting the approach illustrated schematically in FIG. 2 will involve the gating circuitry 120 accessing the associated resource grant register 115 to detect whether it has been set to identify the associated initiator component 110 as the currently granted initiator component.

If the storage structure does indicate that the initiator component X is the currently granted initiator component, then the process proceeds to step 360, where the gating circuitry allows the onward propagation of the transaction to the shared resource. However, if it is determined that the storage structure does not indicate that initiator component X is the currently granted initiator component, then the process proceeds to step 365 where the transaction is blocked by the gating circuitry. As mentioned earlier, in association with blocking the transaction the gating circuitry may issue a dummy response if this is deemed appropriate in order to comply with the transaction protocol. In addition, at step 370, the recovery action is triggered, by asserting a signal to either the associated initiator component, or in an alternative implementation to the shared resource management circuitry.

Figure 6A:
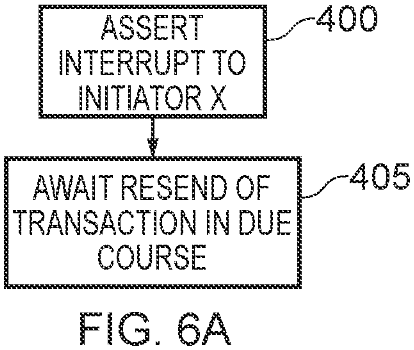
FIGS. 6A to 6C are flow diagrams illustrating steps that can be performed by the gating circuitry in order to trigger the recovery action, in accordance with different example implementations.
Figure 6B:
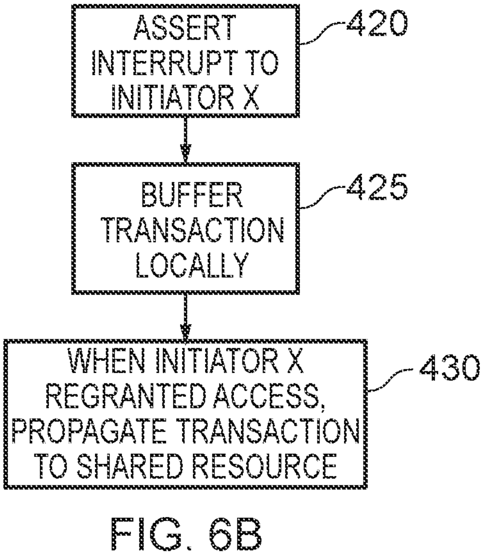
Figure 6C:
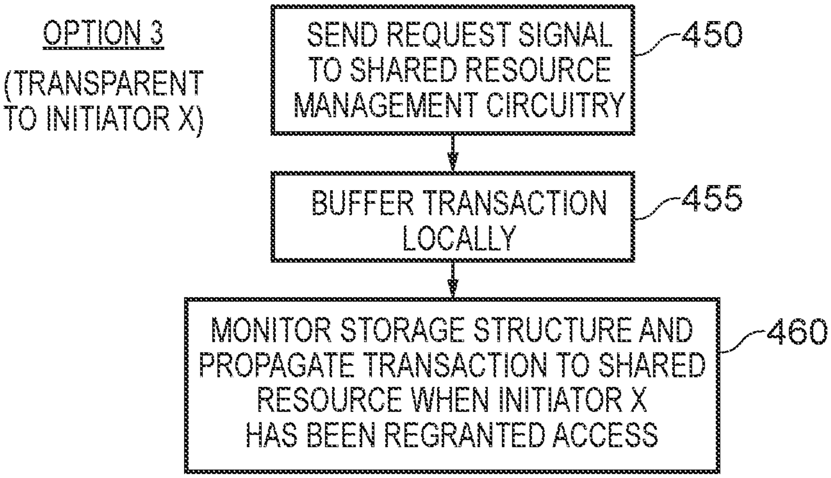

FIGS. 6A to 6C illustrate various ways in which the recovery action can be triggered at step 370 of FIG. 5, in accordance with different example implementations. In accordance with the first option illustrated in FIG. 6A, then the gating circuitry is arranged to assert an interrupt signal to the initiator component X at step 400, and thereafter will await the resend of the transaction from the initiator component X in due course at step 405. As discussed earlier, the transaction will in this case be resent once the initiator component has perform the required interrupt service routine in order to re-request grant of access to the shared resource, and has then determined with reference to the associated storage element that it has in fact been re-granted access.

FIG. 6B illustrates an alternative option for implementing step 370. Again, the process starts by asserting an interrupt to the initiator component X at step 420. However, in addition the transaction that has been blocked is buffered locally by the gating circuitry at step 425. Then, at step 430, when the initiator component X is re-granted access, the gating circuitry merely propagates the buffered transaction to the shared resource. There are various ways in which the gating circuitry may determine when initiator component X has been re-granted access. For example, the initiator component X could monitor the storage structure after having issued the grant request signal, and notify the gating circuitry when it has been re-granted access, or alternatively the gating circuitry could monitor the storage structure directly in order to determine when access has been re-granted. As noted earlier, in some implementations where the gating circuitry is arranged to monitor the storage structure directly, it may be possible to allow the initiator component X to undertake other useful processing tasks whilst waiting for access to be re-granted.

FIG. 6C illustrates a further alternative option where the blocking of the transaction by the gating circuitry is handled in a manner that is transparent to the initiator component X. At step 450, the gating circuitry is arranged to directly send a request signal to the shared resource management circuitry, rather than issuing an interrupt signal to the initiator component X. Further, the blocked transaction is buffered locally at step 455 by the gating circuitry. Thereafter, at step 460, the gating circuitry is arranged to monitor the storage structure in order to determine when the initiator component X has been re-granted access to the shared resource, and at that point is arranged to propagate the transaction on to the shared resource. By such an approach, the initiator component X does not need to be made aware that the transaction has been blocked, and the transaction will just be handled in the normal manner, for example with the initiator component getting a usual expected transaction response as a result of the transaction being propagated in due course on to the shared resource.

As a further modification to the approach of FIG. 6C, rather than handling the blocking entirely transparently to the initiator component X, the gating circuitry could notify the initiator component X that the handling of the transaction has been delayed, allowing initiator component X to switch context and perform some other useful processing in the interim. Then, in due course, once the gating circuitry detects that the initiator component has been re-granted access, it can release the buffered transaction, and notify the initiator component X accordingly so that the initiator component can switch back to the original context where it was processing transactions in respect of the shared resource.

Through use of the techniques described herein, it is possible to reduce the chance of multiple initiator components accessing a shared resource at the same time by ensuring that the resource management circuitry only indicates one initiator component as being the currently granted initiator component at any point in time, with the use of the gating circuitry then ensuring that expected program flow is only broken when a real access violation is detected (i.e. when a transaction being reviewed by the gating circuitry originates from an initiator component that is at that point in time no longer indicated as being the currently granted initiator component). Further, it simplifies the functionality performed at an initiator component, as the initiator component is only required to check whether it is granted access once after it has requested access, and thereafter can assume that it continues to be granted access, due to the gating circuitry detecting any situation where the initiator component seeks to make an access to the shared resource when it is no longer the currently granted initiator component.

Other example arrangements are set out in the following clauses:

1. An apparatus comprising:
   - a given initiator component to initiate transactions to access a shared resource, where the given initiator component is one of a plurality of initiator components that share access to the shared resource;
   - shared resource management circuitry to select, from amongst the plurality of initiator components, a currently granted initiator component that is currently allowed to access the shared resource, and to identify the currently granted initiator component within a storage structure; and
   - gating circuitry located in a communication path between the given initiator component and the shared resource to receive a given transaction initiated by the given initiator component to access the shared resource, and to determine with reference to the storage structure whether the given initiator component is the currently granted initiator component;
   - wherein the gating circuitry is arranged, when the currently granted initiator component is the given initiator component, to allow onward propagation of the given transaction to the shared resource, and is arranged, when the currently granted initiator component is other than the given initiator component, to block onward propagation of the given transaction to the shared resource and to trigger a recovery action to seek to facilitate future handling of the given transaction.
2. An apparatus as in Clause 1, wherein the gating circuitry is arranged to trigger the recovery action by asserting a signal that triggers processing to be performed in order to cause the shared resource management circuitry to select the given initiator component as the currently granted initiator component, to thereby allow the given transaction to be propagated to the shared resource.
3. An apparatus as in Clause 1 or Clause 2, wherein the given initiator component is arranged, prior to initiating a first transaction of a sequence of transactions, to determine with reference to the storage structure whether the given initiator component is the currently granted initiator component, and to issue a grant request signal to the shared resource management circuitry when the currently granted initiator component is indicated to be other than the given initiator component.
4. An apparatus as in Clause 3, wherein:
   - the shared resource management circuitry is arranged, in response to the grant request signal, to select the given initiator component as the currently granted initiator component; and
   - the given initiator component is arranged, following issuance of the grant request signal, to monitor the storage structure in order to detect when the given initiator component is indicated as the currently granted initiator component.

5. An apparatus as in Clause 3 or Clause 4, wherein the given initiator component is arranged, responsive to detecting that the currently granted initiator component is the given initiator component, to initiate the first transaction, and to then initiate each subsequent transaction in the sequence of transactions without further reference to the storage structure, unless interrupted by the gating circuitry triggering the recovery action in response to detecting that the given initiator component is no longer the currently granted initiator component.

6. An apparatus as in any preceding clause, wherein the gating circuitry is arranged to trigger the recovery action by asserting an interrupt signal to the given initiator component to cause the given initiator component to execute a given exception handling routine.

7. An apparatus as in Clause 6, wherein the given initiator component is arranged, on executing the given exception handling routine, to issue a grant request signal to the shared resource management circuitry, and to then monitor the storage structure in order to detect when the given initiator component is once again indicated to be the currently granted initiator component.

8. An apparatus as in Clause 7, wherein the given initiator component is arranged to re-initiate the given transaction in response to detecting that the given initiator component is once again indicated to be the currently granted initiator component.

9. An apparatus as in Clause 6 or Clause 7, wherein:

the gating circuitry is arranged, when triggering the recovery action, to store the given transaction within buffer circuitry accessible to the gating circuitry, to enable the given transaction to be forwarded on to the shared resource by the gating circuitry once the given initiator component is once again indicated to be the currently granted initiator component, without the given initiator component being required to re-initiate the given transaction.

10. An apparatus as in any of clauses 6 to 9, wherein the transactions initiated by the given initiator component conform to a transaction protocol that requires a response to be provided to the given initiator component for each transaction initiated by the given initiator component, and the gating circuitry is arranged, when blocking onward propagation of the given transaction to the shared resource, to provide a dummy response to the given initiator component in order to provide compliance with the transaction protocol.

11. An apparatus as in any of clauses 1 to 5, wherein the gating circuitry is arranged to trigger the recovery action by sending a request signal to the shared resource management circuitry to request that the currently granted initiator component is updated to be the given initiator component.

12. An apparatus as in Clause 11, wherein:

the gating circuitry is arranged, when triggering the recovery action, to store the given transaction within buffer circuitry accessible to the gating circuitry; and the gating circuitry is arranged, following sending of the request signal to the shared resource management circuitry, to monitor the storage structure in order to detect when the given initiator component is once again indicated to be the currently granted initiator component, and upon such detection to output the given transaction from the buffer circuitry for onward propagation to the shared resource.

13. An apparatus as in any preceding clause, wherein a separate instance of the gating circuitry is provided for each initiator component in the plurality of initiator components, such that a given instance of the gating circuitry has an associated initiator component amongst the plurality of initiator components and is arranged to control whether to block or allow onward propagation of a transaction issued by the associated initiator component in dependence on whether the associated initiator component is identified in the storage structure as the currently granted initiator component.

14. An apparatus as in any of clauses 1 to 12, wherein the gating circuitry is arranged to receive transactions issued by the plurality of initiator components and, for a given received transaction, to determine the initiator component that initiated the given received transaction and to block or allow onward propagation of the given received transaction in dependence on whether the initiator component that initiated the given received transaction is identified in the storage structure as the currently granted initiator component.

15. An apparatus as in any preceding clause, wherein the shared resource management circuitry is arranged to control the storage structure to ensure that, at any point in time, only one initiator component is indicated as the currently granted initiator component.

16. An apparatus as in any preceding clause, wherein the storage structure is a single storage element identifying the currently granted initiator component.

17. An apparatus as in any of clauses 1 to 15, wherein the storage structure comprises a plurality of storage elements, where each storage element is associated with one of the initiator components in the plurality of initiator components and is arranged to identify whether the associated initiator component is the currently granted initiator component.

18. An apparatus as in any preceding clause, wherein the gating circuitry is arranged to receive at least write transactions issued by the given initiator component.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware that provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

a given initiator processing circuit configured to initiate transactions to access a shared resource, where the given initiator processing circuit is one of a plurality of initiator processing circuits that share access to the shared resource;

shared resource management circuitry configured to select, from amongst the plurality of initiator processing circuits, a currently granted initiator processing circuit that is currently allowed to access the shared resource, and to identify the currently granted initiator processing circuit within a storage structure; and gating circuitry located in a communication path between the given initiator processing circuit and the shared resource and configured to receive a given transaction initiated by the given initiator processing circuit to access the shared resource, and configured to determine with reference to the storage structure whether the given initiator processing circuit is the currently granted initiator processing circuit;

wherein the gating circuitry is configured, when the currently granted initiator processing circuit is the given initiator processing circuit, to allow onward propagation of the given transaction to the shared resource, and is configured, when the currently granted initiator processing circuit is other than the given initiator processing circuit, to block onward propagation of the given transaction to the shared resource and to trigger a recovery action to seek to facilitate future handling of the given transaction, wherein the gating circuitry is configured to trigger the recovery action by asserting an interrupt signal to the given initiator processing circuit to cause the given initiator processing circuit to execute a given exception handling routine, wherein the transactions initiated by the given initiator processing circuit conform to a transaction protocol that requires a response to be provided to the given initiator processing circuit for each transaction initiated by the given initiator processing circuit, and the gating circuitry is configured, when blocking onward propagation of the given transaction to the shared resource, to provide a dummy response to the given initiator processing circuit in order to provide compliance with the transaction protocol, and wherein assertion of the interrupt signal in combination with provision of the dummy response causes the given initiator processing circuit to discard the dummy response.

2. The apparatus as claimed in claim 1, wherein the gating circuitry is configured to trigger the recovery action by asserting a signal that triggers processing to be performed in order to cause the shared resource management circuitry to select the given initiator processing circuit as the currently granted initiator processing circuit, to thereby allow the given transaction to be propagated to the shared resource.

3. The apparatus as claimed in claim 1, wherein the given initiator processing circuit is configured, prior to initiating a first transaction of a sequence of transactions, to determine with reference to the storage structure whether the given initiator processing circuit is the currently granted initiator processing circuit, and to issue a grant request signal to the shared resource management circuitry when the currently granted initiator processing circuit is indicated to be other than the given initiator processing circuit.

4. The apparatus as claimed in claim 3, wherein:

the shared resource management circuitry is configured, in response to the grant request signal, to select the given initiator processing circuit as the currently granted initiator processing circuit; and the given initiator processing circuit is configured, following issuance of the grant request signal, to monitor the storage structure in order to detect when the given initiator processing circuit is indicated as the currently granted initiator processing circuit.

5. The apparatus as claimed in claim 3, wherein the given initiator processing circuit is configured, responsive to detecting that the currently granted initiator processing circuit is the given initiator processing circuit, to initiate the first transaction, and to then initiate each subsequent transaction in the sequence of transactions without further reference to the storage structure, unless interrupted by the gating circuitry triggering the recovery action in response to detecting that the given initiator processing circuit is no longer the currently granted initiator processing circuit.

6. The apparatus as claimed in claim 1, wherein the given initiator processing circuit is configured, on executing the given exception handling routine, to issue a grant request signal to the shared resource management circuitry, and to then monitor the storage structure in order to detect when the given initiator processing circuit is once again indicated to be the currently granted initiator processing circuit.

7. The apparatus as claimed in claim 6, wherein the given initiator processing circuit is configured to re-initiate the given transaction in response to detecting that the given initiator processing circuit is once again indicated to be the currently granted initiator processing circuit.

8. The apparatus as claimed in claim 1, wherein:

the gating circuitry is configured, when triggering the recovery action, to store the given transaction within buffer circuitry accessible to the gating circuitry, to enable the given transaction to be forwarded on to the shared resource by the gating circuitry once the given initiator processing circuit is once again indicated to be the currently granted initiator processing circuit, without the given initiator processing circuit being required to re-initiate the given transaction.

9. The apparatus as claimed in claim 1, wherein the gating circuitry is configured to trigger the recovery action by sending a request signal to the shared resource management circuitry to request that the currently granted initiator processing circuit is updated to be the given initiator processing circuit.

10. The apparatus as claimed in claim 9, wherein:

the gating circuitry is configured, when triggering the recovery action, to store the given transaction within buffer circuitry accessible to the gating circuitry; and the gating circuitry is configured, following sending of the request signal to the shared resource management circuitry, to monitor the storage structure in order to detect when the given initiator processing circuit is once again indicated to be the currently granted initiator processing circuit, and upon such detection to output the given transaction from the buffer circuitry for onward propagation to the shared resource.

11. The apparatus as claimed in claim 1, wherein a separate instance of the gating circuitry is provided for each initiator processing circuit in the plurality of initiator processing circuits, such that a given instance of the gating circuitry has an associated initiator processing circuit amongst the plurality of initiator processing circuits and is configured to control whether to block or allow onward propagation of a transaction issued by the associated initiator processing circuit in dependence on whether the associated initiator processing circuit is identified in the storage structure as the currently granted initiator processing circuit.

12. The apparatus as claimed in claim 1, wherein the gating circuitry is configured to receive transactions issued by the plurality of initiator processing circuits and, for a given received transaction, to determine an initiator processing circuit that initiated the given received transaction and to block or allow onward propagation of the given received transaction in dependence on whether the initiator processing circuit that initiated the given received transaction is identified in the storage structure as the currently granted initiator processing circuit.

13. The apparatus as claimed in claim 1, wherein the shared resource management circuitry is configured to control the storage structure to ensure that, at any point in time, only one initiator processing circuit is indicated as the currently granted initiator processing circuit.

14. The apparatus as claimed in claim 1, wherein the storage structure is a single storage element identifying the currently granted initiator processing circuit.

15. The apparatus as claimed in claim 1, wherein the storage structure comprises a plurality of storage elements, where each storage element is associated with one of the initiator processing circuits in the plurality of initiator processing circuits and is configured to identify whether an associated initiator processing circuit is the currently granted initiator processing circuit.

16. The apparatus as claimed in claim 1, wherein the gating circuitry is configured to receive at least write transactions issued by the given initiator processing circuit.

17. A method of controlling access to a shared resource accessible to a plurality of initiator processing circuits, comprising:

employing shared resource management circuitry to select, from amongst the plurality of initiator processing circuits, a currently granted initiator processing circuit that is currently allowed to access the shared resource, and to identify the currently granted initiator processing circuit within a storage structure; and receiving, at gating circuitry located in a communication path between a given initiator processing circuit of the plurality of initiator processing circuits and the shared resource, a given transaction initiated by the given initiator processing circuit to access the shared resource, and determining with reference to the storage structure whether the given initiator processing circuit is the currently granted initiator processing circuit;

when the currently granted initiator processing circuit is the given initiator processing circuit, causing the gating circuitry to allow onward propagation of the given transaction to the shared resource; and when the currently granted initiator processing circuit is other than the given initiator processing circuit, causing the gating circuitry to block onward propagation of the given transaction to the shared resource and to trigger a recovery action to seek to facilitate future handling of the given transaction, wherein the gating circuitry is caused to trigger the recovery action by asserting an interrupt signal to the given initiator processing circuit to cause the given initiator processing circuit to execute a given exception handling routine, wherein the transactions initiated by the given initiator processing circuit conform to a transaction protocol that requires a response to be provided to the given initiator processing circuit for each transaction initiated by the given initiator processing circuit, and the gating circuitry is caused, when blocking onward propagation of the given transaction to the shared resource, to provide a dummy response to the given initiator processing circuit in order to provide compliance with the transaction protocol, and wherein assertion of the interrupt signal in combination with provision of the dummy response causes the given initiator processing circuit to discard the dummy response.

18. A non-transitory computer-readable medium to store computer-readable code for fabrication of an apparatus comprising:

a given initiator processing circuit to initiate transactions to access a shared resource, where the given initiator processing circuit is one of a plurality of initiator processing circuits that share access to the shared resource;

shared resource management circuitry to select, from amongst the plurality of initiator processing circuits, a currently granted initiator processing circuit that is currently allowed to access the shared resource, and to identify the currently granted initiator processing circuit within a storage structure; and gating circuitry located in a communication path between the given initiator processing circuit and the shared resource to receive a given transaction initiated by the given initiator processing circuit to access the shared resource, and to determine with reference to the storage structure whether the given initiator processing circuit is the currently granted initiator processing circuit;

wherein the gating circuitry is configured, when the currently granted initiator processing circuit is the given initiator processing circuit, to allow onward propagation of the given transaction to the shared resource, and is configured, when the currently granted initiator processing circuit is other than the given initiator processing circuit, to block onward propagation of the given transaction to the shared resource and to trigger a recovery action to seek to facilitate future handling of the given transaction, wherein the gating circuitry is configured to trigger the recovery action by asserting an interrupt signal to the given initiator processing circuit to cause the given initiator processing circuit to execute a given exception handling routine, wherein the transactions initiated by the given initiator processing circuit conform to a transaction protocol that requires a response to be provided to the given initiator processing circuit for each transaction initiated by the given initiator processing circuit, and the gating circuitry is configured, when blocking onward propagation of the given transaction to the shared resource, to provide a dummy response to the given initiator processing circuit in order to provide compliance with the transaction protocol, and wherein assertion of the interrupt signal in combination with provision of the dummy response causes the given initiator processing circuit to discard the dummy response.

* * * * *